United States Patent
Fahey et al.

(10) Patent No.: US 11,613,366 B2
(45) Date of Patent: Mar. 28, 2023

(54) LUMBAR SUPPORT SYSTEMS FOR EJECTION SEAT

(71) Applicant: AMI Industries, Inc., Colorado Springs, CO (US)

(72) Inventors: Tyler Fahey, Woodland Park, CO (US); Glen Shaw, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 52 days.

(21) Appl. No.: 17/180,031

(22) Filed: Feb. 19, 2021

(65) Prior Publication Data

US 2021/0309378 A1    Oct. 7, 2021

Related U.S. Application Data

(60) Provisional application No. 63/006,568, filed on Apr. 7, 2020.

(51) Int. Cl.
*B64D 25/10*    (2006.01)
*B60N 2/66*    (2006.01)

(52) U.S. Cl.
CPC ............. *B64D 25/10* (2013.01); *B60N 2/665* (2015.04)

(58) Field of Classification Search
CPC ...................................................... B64D 25/10
See application file for complete search history.

(56) References Cited

U.S. PATENT DOCUMENTS

| | | | |
|---|---|---|---|
| 3,698,670 A | 10/1972 | Ewing | |
| 3,966,146 A | 6/1976 | Roberts | |
| 4,059,909 A * | 11/1977 | Kron | B64D 11/0689 297/180.12 |
| 4,239,282 A | 12/1980 | White | |
| 5,419,614 A | 5/1995 | Richards et al. | |
| 5,427,331 A * | 6/1995 | Stroud | B64D 11/0689 244/122 AG |
| 6,055,473 A * | 4/2000 | Zwolinski | G01G 19/4142 701/45 |
| 6,209,159 B1 * | 4/2001 | Murphy | A47C 27/146 5/709 |
| 6,731,088 B2 | 5/2004 | Nivet | |
| 2015/0375865 A1 * | 12/2015 | Fischer | B60N 2/22 701/49 |
| 2018/0125744 A1 | 5/2018 | Weber et al. | |

(Continued)

FOREIGN PATENT DOCUMENTS

| | | |
|---|---|---|
| EP | 3575144 | 4/2019 |
| GB | 2495521 | 4/2013 |

OTHER PUBLICATIONS

United Kingdom International Property Office, United Kingdom Search Report dated Aug. 27, 2021 in application No. GB2104763.4.

*Primary Examiner* — Richard G Davis
(74) *Attorney, Agent, or Firm* — Snell & Wilmer L.L.P.

(57) ABSTRACT

A lumbar support system for use in an ejection seat of an aircraft, comprising may comprise a pump; a plurality of bladders fluidly coupled to the pump; and a controller electrically coupled to the pump, the controller operable to: select a bladder in the plurality of bladders to fluidly isolate the bladder from a remainder of bladders in the plurality of bladders; and command the pump to inflate the bladder.

12 Claims, 7 Drawing Sheets

(56) References Cited

U.S. PATENT DOCUMENTS

| | | | |
|---|---|---|---|
| 2018/0199729 A1* | 7/2018 | Bullard | .................. A47C 7/142 |
| 2018/0304774 A1 | 10/2018 | Mizoi | |
| 2018/0326881 A1 | 11/2018 | Patrick et al. | |
| 2020/0148366 A1* | 5/2020 | Fagan | ................ B64D 11/0619 |
| 2021/0309380 A1* | 10/2021 | Fahey | .................... B64D 25/10 |

* cited by examiner

LUMBAR SUPPORT SYSTEMS FOR EJECTION SEAT

CROSS-REFERENCE TO RELATED APPLICATIONS

This application is a non-provisional of, and claims priority to, and the benefit of U.S. Provisional Application No. 63/006,568, entitled "LUMBAR SUPPORT SYSTEMS FOR EJECTION SEAT," filed on Apr. 7, 2020, which is hereby incorporated by reference in its entirety.

FIELD

The present disclosure relates to ejection seats, and more specifically, to lumbar support systems for ejection seats.

BACKGROUND

Ejection systems are designed to expel pilots from an aircraft cockpit. Ejection seats in high performance aircraft benefit from safely removing the pilot or other occupant from the disabled aircraft across a wide variety of aircraft speed regimes, altitudes and aircraft attitudes. Ejection seats may be uncomfortable for long flight missions, resulting in pilot fatigue.

SUMMARY

A lumbar support system for use in an ejection seat of an aircraft is disclosed herein. The lumbar support system may comprise: a pump; a plurality of bladders fluidly coupled to the pump; and a controller electrically coupled to the pump, the controller operable to: select a bladder in the plurality of bladders to fluidly isolate the bladder from a remainder of bladders in the plurality of bladders; and command the pump to inflate the bladder.

In various embodiments, the lumbar support system may further comprise a seat pad, wherein the plurality of bladders and the seat pad are a monolithic component. The plurality of bladders may be configured to be disposed in a seat pad of the ejection seat. The controller may further be operable to command the pump to vary an inflation and a deflation of the plurality of bladders in response to receiving a massage command. The plurality of bladders may comprise a first bladder, a second bladder, and a third bladder, wherein the first bladder is configured to be disposed proximate a seat bucket in a seat back of the ejection seat, wherein the second bladder is configured to be disposed vertically adjacent to the first bladder, and wherein the second bladder is configured to be disposed between the first bladder and the third bladder. The controller may be further operable to select the plurality of bladders to all be in fluid communication with the pump. The controller may be further operable to inflate or deflate all of the plurality of bladders simultaneously.

A lumbar support system for use in an ejection seat of an aircraft is disclosed herein. The lumbar support system may comprise: a motor; a plurality of springs operably coupled to the motor; and a controller electrically coupled to the motor, the controller operable to command the motor to actuate the plurality of springs.

In various embodiments, the lumbar support system may further comprise a mating pad coupled to a first end of the plurality of springs. The lumbar support system may further comprise a mount coupled to a second end of the plurality of springs, the second end opposite the first end. The mating pad may be configured to abut a seating pad of the ejection seat. The mount may be configured to be coupled to a seat back of the ejection seat. The plurality of springs may be configured to actuate away from the mount and toward the mating pad. The controller may be further operable to: select a portion of springs in the plurality of springs to operably isolate the portion of springs from a remainder of springs in the plurality of springs; and command the motor to actuate the portion of springs.

An aircraft ejection seat is disclosed herein. The aircraft ejection seat may comprise: a seat bucket; a seat back coupled to the seat bucket; and a lumbar support system disposed in the seat back, the lumbar support system comprising: a seat pad coupled to the seat back; an adjustable lumbar region disposed in the seat pad; and a controller electrically coupled to at least one of a motor and a pump, the controller operable to adjust and vary a pressure in a lumbar region in response to receiving a massage command.

In various embodiments, the aircraft ejection seat may further comprise an armrest, a cockpit display, and a control system, the armrest coupled to the seat back, the control system coupled to at least one of the armrest and the cockpit display. The seat pad and the adjustable lumbar region may be a monolithic component. The adjustable lumbar region may comprise a bladder in fluid communication with the pump. The adjustable lumbar region may comprise a plurality of springs coupled to the seat pad. The plurality of springs may be operably coupled to the motor, and the motor may be configured to actuate the plurality of springs.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Typical seat back cushions for ejection seats of aircraft ejection systems have minimal ergonomic features and may be uncomfortable for long flight missions. The minimal ergonomic and/or comfort features may lead to pilot fatigue during longer missions with high consecutive flight hours. Fatigue may result in a decrease in pilot concentration and performance during the longer missions. Typical ejection seat back cushions are single components, non-adjustable, and/or non-adaptable.

Disclosed herein, is a lumbar support assembly for use in an ejection seat and/or an aircraft ejection system. In various embodiments, the lumbar support assembly may be adjustable and/or customizable. In this regard, the lumbar support assembly may be adjusted manually and/or automatically to enhance a lumbar support for an occupant. In various embodiments, the lumbar support assembly may comprise a plurality of air chambers and a pump. In various embodiments, the lumbar support assembly may comprise a plurality of springs coupled to a mat.

Figure 1:
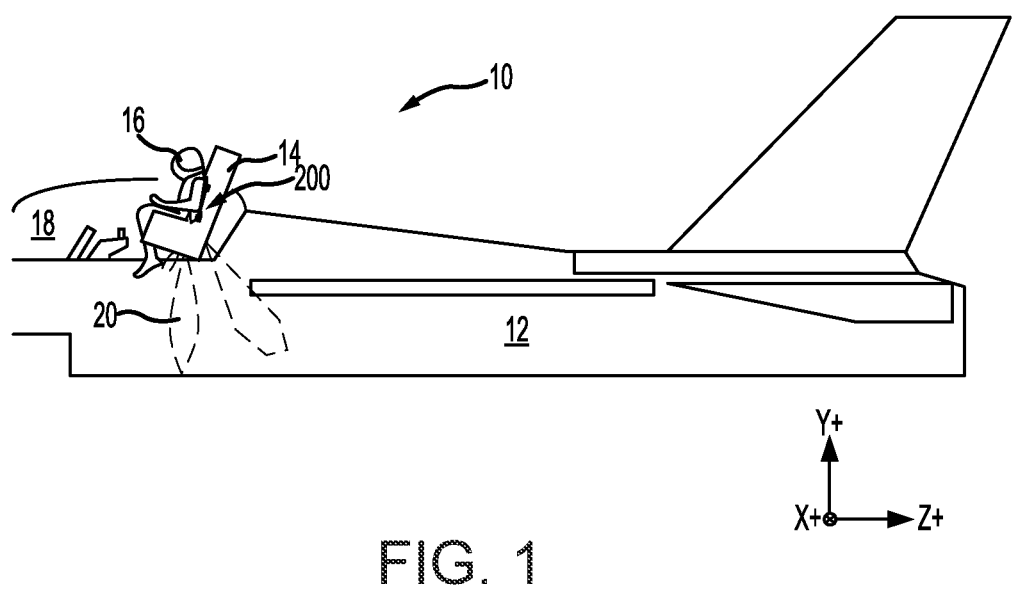
FIG. 1 illustrates an aircraft ejection system, in accordance with various embodiments.

With reference to FIG. 1, an aircraft ejection system 10 is shown, in accordance with various embodiments. Aircraft ejection system 10 may be installed in aircraft 12 to expel an ejection seat 14 and an occupant 16 of ejection seat 14 from a cockpit 18 of aircraft 12. Ejection seat 14 may be urged from cockpit 18 by a propulsion system 20. In accordance with various embodiments, ejection seat 14 includes a lumbar support system 200. Lumbar support system 200 may be disposed within a seat back pad of the ejection seat 14. The lumbar support system 200 may be customizable for the occupant and/or configurable to provide ergonomic relief to a lumbar region of the occupant 16. In various embodiments, the lumbar support system 200 may be sized and configured to be retrofitted into a typical ejection seat.

Figure 2:
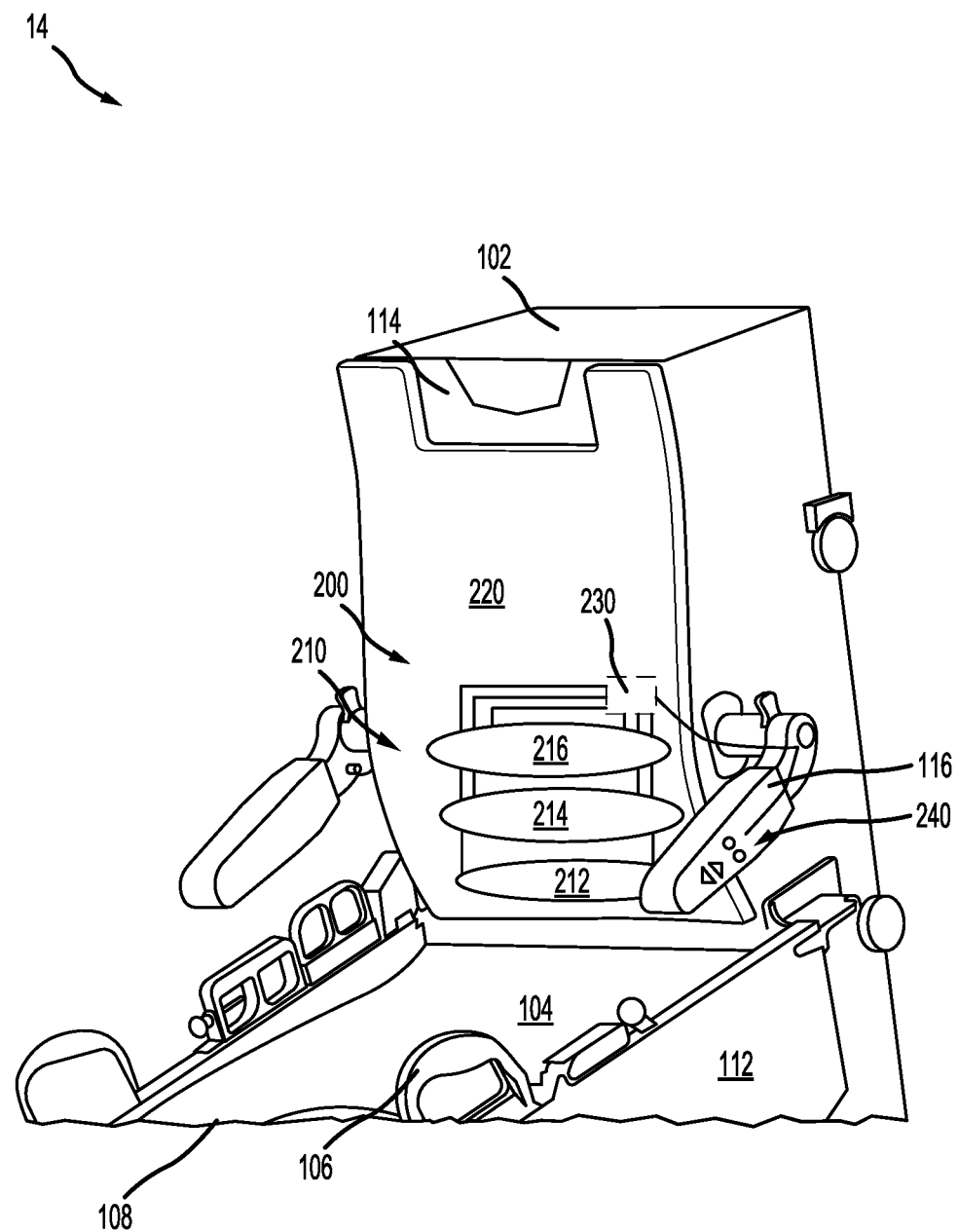
FIG. 2 illustrates an ejection seat having a lumbar support system, in accordance with various embodiments.

Referring now to FIG. 2, an ejection seat 14 is illustrated with a lumbar support system 200, in accordance with various embodiments. Ejection seat 14 includes a seat back 102 and a seat bucket 104. The lumbar support system 200 is coupled to, and/or disposed within, seat back 102. In various embodiments, an ejection handle 106 may be located proximate a side 112 of seat bucket 104. While FIG. 2 shows ejection handle 106 located at side 112 of seat bucket 104, it is further contemplated and understood that ejection handle 106 may be located anywhere that is accessible to an occupant of ejection seat 14. For example, ejection handle 106 may be located on a front 108 of seat bucket 104 or a headrest 114 of seat back 102. Front 108 of seat bucket 104 is generally opposite, or distal, seat back 102.

In various embodiments, the lumbar support system 200 comprises an adjustable lumbar region 210. The adjustable lumbar region includes a first bladder 212 disposed in a seat pad 220. In various embodiments, the first bladder 212 may be integral to the seat pad 220. In various embodiments, the first bladder 212 and the seat pad 220 may be a monolithic component. A "monolithic component," as described herein means formed from a single piece (i.e., without seams, joints, or the like). In various embodiments, the first bladder 212 may be a discrete component from the seat pad 220. In various embodiments the lumbar support system 200 further comprises a pump 230 in fluid communication with the first bladder 212. The pump 230 may be configured to increase or decrease an air pressure in first bladder 212. The pump 230 may be in electrical communication with a controller 240. In various embodiments, the controller 240 may be disposed on an armrest 116 coupled to the seat back 102. Although controller 240 is illustrated as being disposed on the armrest 116, a controller integrated into a heads up display, or any other location is within the scope of this disclosure.

In various embodiments, the adjustable lumbar region 210 of the lumbar support system 200 may further comprise a second bladder 214. The first bladder 212 may be disposed vertically proximate the seat bucket 104. The second bladder 214 may be disposed adjacent to the first bladder 212 at a location distal to the seat bucket 104 relative to the first bladder 212. In various embodiments, the second bladder 214 and the seat pad 220 may be a monolithic component. In various embodiments, the second bladder 214 may be a discrete component from the seat pad 220. The second bladder 214 may be in fluid communication with the pump 230. The pump 230 may be configured to increase or decrease an air pressure in the second bladder 214. In various embodiments, the first bladder 212 and the second bladder 214 may be configured to be fluidly isolated from each other. In various embodiments, the first bladder 212 and the second bladder 214 may be configured to be inflated together or separate.

In various embodiments, the adjustable lumbar region 210 of the lumbar support system 200 may further comprise a third bladder 216. The third bladder 216 may be disposed adjacent to the second bladder 214 at a location distal to the seat bucket 104. In various embodiments, the second bladder 214 is disposed between the first bladder 212 and the third bladder 216. In various embodiments, the third bladder 216 and the seat pad 220 may be a monolithic component. In various embodiments, the third bladder 216 may be a discrete component from the seat pad 220. The third bladder 216 may be in fluid communication with the pump 230. The pump 230 may be configured to increase or decrease an air pressure in the third bladder 216. In various embodiments, the first bladder 212, the second bladder 214, and the third bladder 216 may be configured to be fluidly isolated from each other. In various embodiments, the first bladder 212, the second bladder 214, and the third bladder 216 may be configured to be inflated together or separate. Although adjustable lumbar region 210 is illustrated with only three bladders, any number of bladders is within the scope of this disclosure. For example, adjustable lumbar region may include between 1 and 10 bladders, between 2 and 8 bladders, or between 2 and 6 bladders.

In various embodiments, the pump 230 may be embedded in the seat back 102. Although illustrated as being embedded in the seat back 102, the pump 230 may be externally mounted, disposed below seat bucket 104, or the like.

Figure 3:
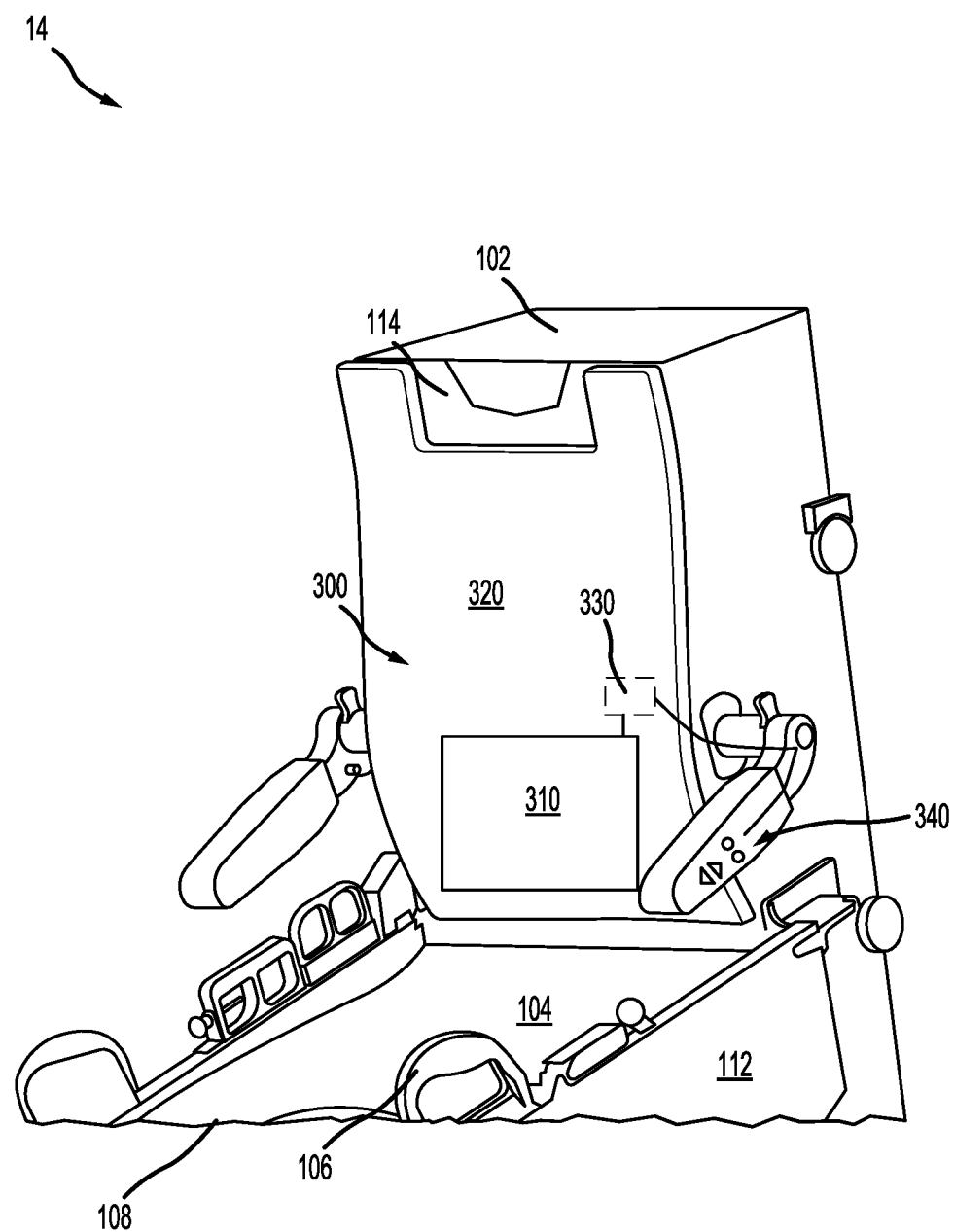
FIG. 3 illustrates an ejection seat having a lumbar support system, in accordance with various embodiments.
Figure 4:
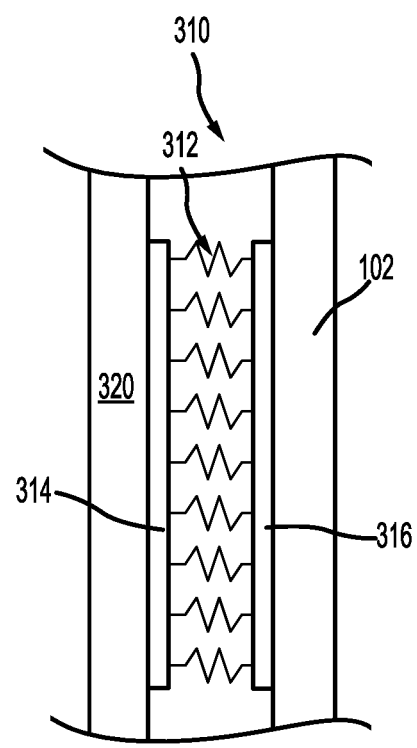
FIG. 4 illustrates a portion of an ejection seat having a lumbar support system, in accordance with various embodiments.

Referring now to FIG. 3, a lumbar support system 300 for an ejection seat is illustrated, in accordance with various embodiments. The lumbar support system 300 may comprise an adjustable lumbar region 310, a seat pad 320, a motor 330, and a controller 340. In various embodiments, the adjustable lumbar region 310 may be integral to the seat pad 320. In various embodiments, the adjustable lumbar region 310 may be a distinct component from the seat pad 320. With combined reference to FIG. 4, the adjustable lumbar region 310 may comprise a plurality of springs disposed between the seat back 102 and the seat pad 320. In various embodiments, the adjustable lumbar region 310 may further comprise a mating pad 314 and/or a mount 316. The mount 316 may be configured to be coupled to the seat back 102. The mating pad 314 may be configured to abut the seat pad 320. In various embodiments, the mating pad 314 may be integral to the seat pad 320. In various embodiments, the mating pad 314 may be coupled to the seat pad 320. In various embodiments, the plurality of springs 312 may be coupled directly to the seat back 102.

In various embodiments, the plurality of springs may be in operable communication with the motor 330. The motor 330 may be configured to drive the plurality of springs from a relaxed (e.g., neutral) state away from the seat back 102 and towards the seat pad 320 into a compression state. In various embodiments, the motor 330 may be configured to pull the plurality of springs from the relaxed state away from seat pad 320 into a tension state. In this regard, the adjustable lumbar region 310 may provide additional support to a lumbar region of an occupant (e.g., occupant 16 from FIG. 1).

In various embodiments, the plurality of springs 312 may be configured to actuate together in concert. In various embodiments, the plurality of springs 312 may actuate by region (e.g., a low region, a middle region, and/or an upper region). In this regard, a lower region of the adjustable lumbar region may be configured to provide greater tension than a middle region and/or an upper region.

Figure 5:
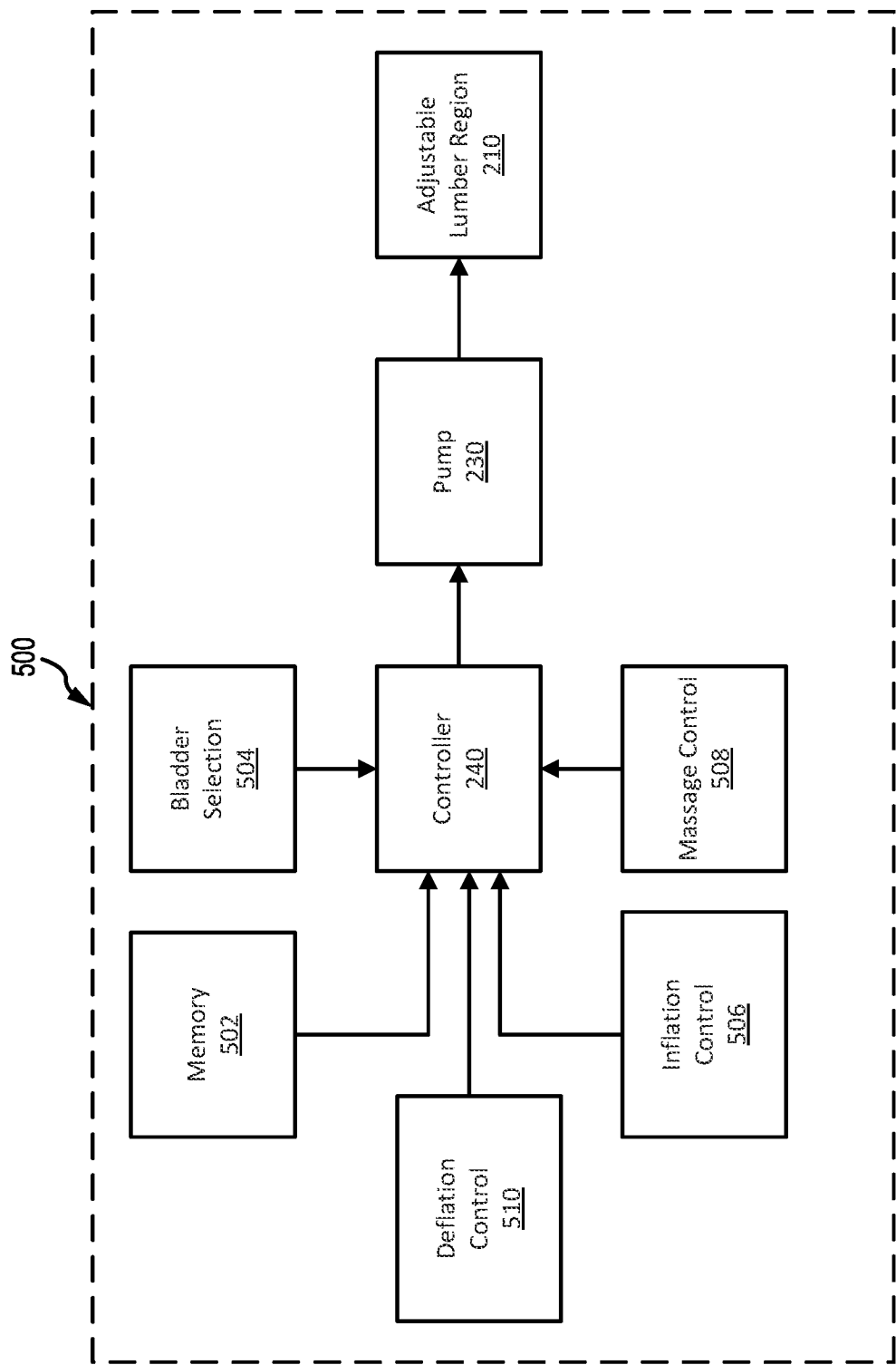
FIG. 5 illustrates a control system for a lumbar support system, in accordance with various embodiments.

In various embodiments and with additional reference to FIG. 5, a schematic block diagram of a control system 500 for adjustable lumbar region 210 is illustrated. Control system 500 includes the controller 240 in electronic communication with the adjustable lumbar region 210. In various embodiments, controller 240 may be integrated into computer systems onboard aircraft 12 and/or ejection seat 14. In various embodiments, controller 240 may be configured as a central network element or hub to access various systems, engines, and components of control system 500. Controller 240 may comprise a network, computer-based system, and/or software components configured to provide an access point to various systems, engines, and components of control system 500. In various embodiments, controller 240 may comprise a processor. In various embodiments, controller 240 may be implemented in a single processor. In various embodiments, controller 240 may be implemented as and may include one or more processors and/or one or more tangible, non-transitory memories and be capable of implementing logic (e.g., memory 502). Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. Controller 240 may comprise a processor configured to implement various logical operations in response to execution of instructions, for example, instructions stored on a non-transitory, tangible, computer-readable medium configured to communicate with controller 240.

In various embodiments, memory 502 may be configured to store preferred settings for adjustable lumber region 210. For example, an occupant (e.g., occupant 16 from FIG. 1) may configure the adjustable lumber region 210 to a desired configuration and save the desired configuration in the memory 502. In various embodiments, the occupant may later load the desired configuration any time thereafter.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, controller 240 may be in electronic communication with a memory 502, a bladder selection control 504, an inflation control 506, a deflation control 510, and/or a massage control 508. Each control (e.g., bladder selection control 504, inflation control 506, and/or massage control 508) may be disposed on armrest 116, on a cockpit display screen, or the like. Bladder selection control 504 may be configured to select a specific bladder in the adjustable lumbar region 210 (e.g., the first bladder 212, the second bladder 214, the third bladder 216, or any number of bladders as disclosed herein). In response to selecting a bladder, the pump 230 may be fluidly coupled only to the selected bladder. In various embodiments, the bladder selection control 504 may include a bladder selection for all bladders to be fluidly coupled to the pump simultaneously.

Inflation control 506 may be configured to increase an air pressure in a specific bladder previously selected from bladder selection control 504 or all bladders. For example, in response to receiving an inflation command from the inflation control 506, the controller 240 may command the adjustable lumbar region to inflate the previously selected bladder from the bladder selection control 504.

Deflation control 510 may be configured to decrease an air pressure in a specific bladder previously selected from bladder selection control 504 or all bladders. For example, in response to receiving an inflation command from the deflation control 510, the controller 240 may command the adjustable lumbar region 210 to inflate the previously selected bladder from the bladder selection control 504.

Massage control 508 may be configured to vary an inflation and a deflation in the bladders in the adjustable lumbar region 210. For example, an occupant may select the massage control 508, and in response, the controller 240 may receive a massage command. The massage command may be sent to the adjustable lumbar region 210. In response to receiving the massage command, the adjustable lumbar region 210 may inflate and deflate first bladder 212, second bladder 214, and third bladder 216. In various embodiments, the first bladder 212 and second bladder 214 may be inflated and deflated out of phase. Similarly, the second bladder 214 and the third bladder 216 may be inflated and deflated out of phase. Any combination of in phase and out of phase inflation/deflation is within the scope of this disclosure. In various embodiments, the first bladder 212, the second bladder 214, and the third bladder 216 may oscillate at any frequency as desired. The controller 240 may be configured to instruct the adjustable lumbar region 210 to massage a lumbar region of an occupant (e.g., occupant 16 from FIG. 1) in response to receiving a command from the massage control 508.

Figure 6:
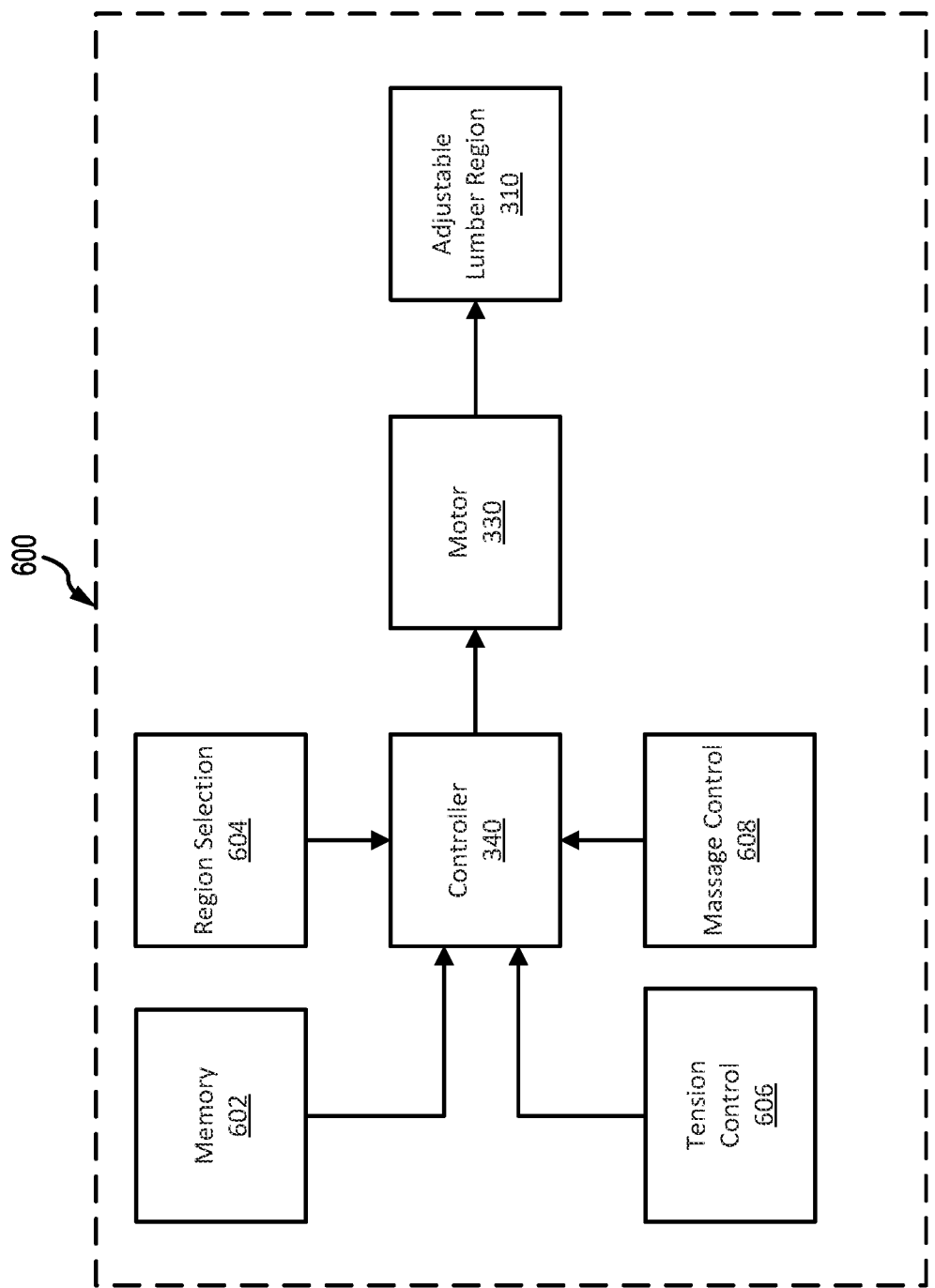
FIG. 6 illustrates a control system for a lumbar support system, in accordance with various embodiments.

With reference now to FIG. 6, a schematic block diagram of a control system 600 for adjustable lumbar region 310 is illustrated. With combined reference to FIGS. 3, 4, and 6, in various embodiments, control system 600 comprises an adjustable lumbar region 310, a motor 330, a controller 340, a memory 602, a region selection control 604, a tension control 606, and/or a massage control 608. The memory 602 may be in accordance with memory 502. Each control (e.g., region selection control 604, tension control 606, and/or massage control 608) may be disposed on armrest 116, on a cockpit display screen, or the like. Region selection control 604 may be configured to select a specific region in the adjustable lumbar region 310 (e.g., a lower region, a middle region, or an upper region). In response to selecting a region, the motor 330 may be configured to only actuate the portion of springs in the plurality of springs 312 in the selected region. In various embodiments, the region selection control 604 may include a region selection for all regions in the adjustable lumbar region to be operably coupled to the motor 330 simultaneously.

Tension control 606 may be configured to increase a tension of a portion of springs from the plurality of springs 312 in a selected region previously selected from region selection control 604 or the entire adjustable lumbar region 310. For example, in response to receiving an increase tension command from the tension control 606, the controller 340 may command the adjustable lumbar region 310 to actuate the portion of springs from the plurality of springs toward the seat pad 320 and away from the seat back 102 into a compression state and/or away from the seat pad 320 into a tension state in the previously selected region.

Massage control 608 may be configured to vary a tension of the plurality of springs in the bladders in the adjustable lumbar region 310. For example, an occupant may select the massage control 608, and in response, the controller 340 may receive a massage command. The massage command may be sent to the adjustable lumbar region 310. In response to receiving the massage command, the adjustable lumbar region 310 may actuate the plurality of springs. In various embodiments, the first bladder 212 and second bladder 214 may be inflated and deflated out of phase. Similarly, the second bladder 214 and the third bladder 216 may be inflated and deflated out of phase. Any combination of in phase and out of phase inflation/deflation at any desired frequency is within the scope of this disclosure. The controller 240 may be configured to instruct the adjustable lumbar region 310 to massage a lumbar region of an occupant (e.g., occupant 16 from FIG. 1) in response to receiving a command from the massage control 508.

Figure 7:
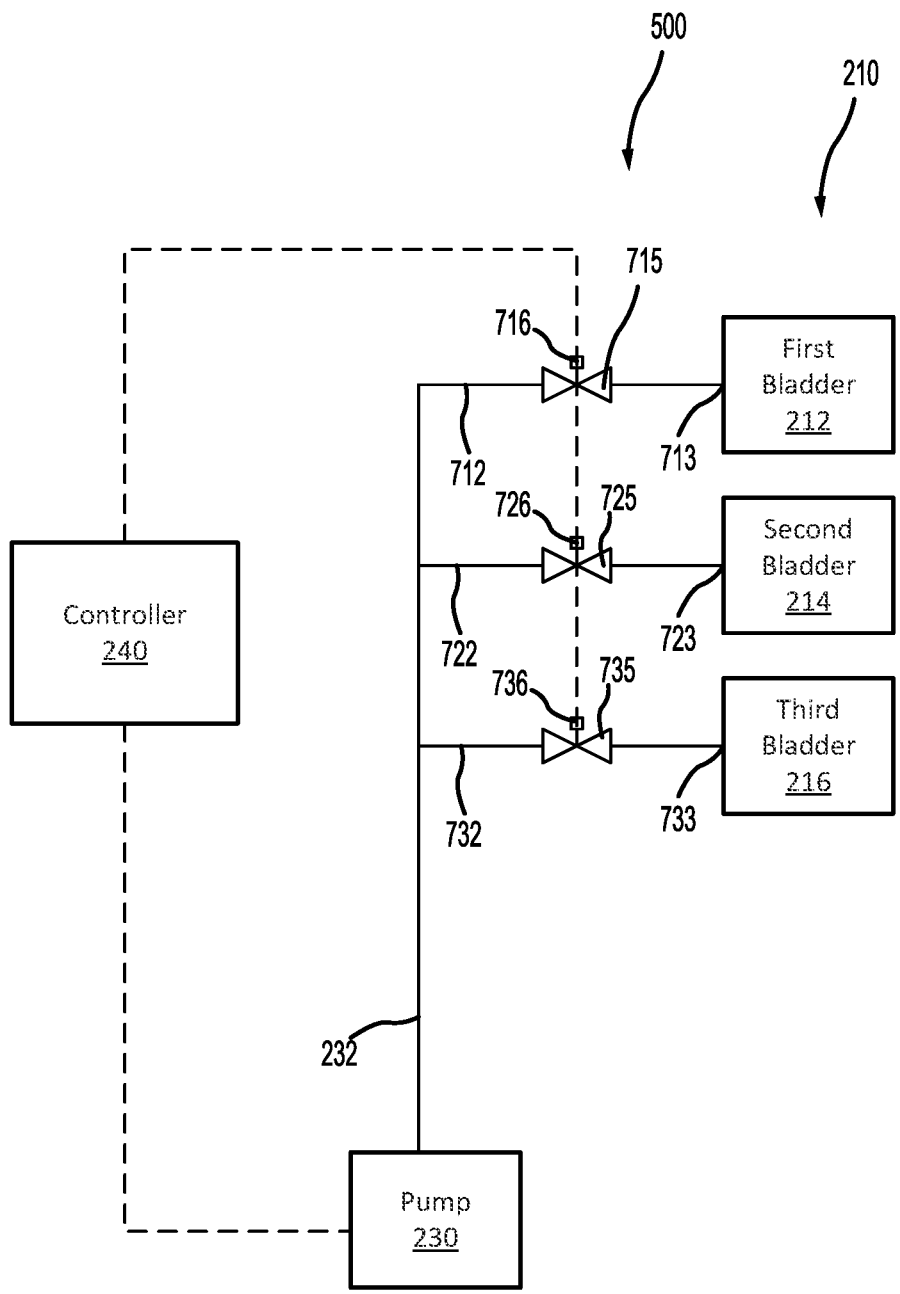
FIG. 7 illustrates a control system for a lumbar support system, in accordance with various embodiments.

Referring now to FIG. 7, a schematic block diagram further defining control system 500 is illustrated, in accordance with various embodiments. In various embodiments, first bladder 212, second side bladder 214, and third bladder 216 of adjustable lumber region 210 may be in fluid communication with pump 230. In this regard, a main pump fluid line 232 may be fluidly coupled to a bladder specific line for each bladder. For example, a first fluid line 712 extends from main pump fluid line 232 to an inlet 713 of first bladder 212, a second fluid line 722 extends from main pump fluid line to an inlet 723 of second bladder 214, a third fluid line 732 extends from the main pump fluid line 232 to an inlet 733 of the third bladder 216.

In various embodiments, an isolation valve is disposed between the main pump fluid line 232 to and each side bladder. For example, a first isolation valve 715 is disposed between the main pump fluid line 232 and the inlet 713 of the first bladder 212, a second isolation valve 725 is disposed between the main pump fluid line 232 and the inlet 723 of the second bladder 214, a third isolation valve 735 is disposed between the main pump fluid line 232 and the inlet 733 of the third bladder 216.

In various embodiments, an actuator is coupled to each isolation valve. For example, a first actuator 716 is coupled to the first isolation valve 715, a second actuator 726 is coupled to the second isolation valve 725, a third actuator 736 is coupled to the third isolation valve 735. Each actuator may be configured to actuate a respective isolation valve open or close. Each actuator may be in electrical communication with controller 240. In this regard, in various embodiments, in response to an occupant (e.g., occupant 16 from FIG. 1) selecting first bladder 212 to be inflated, controller 240 may send a command signal to first actuator 716 to open first isolation valve 715 and a command signal to a remainder of actuators (e.g., second actuator 726 and third actuator 736) to close their respective isolation valves.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A lumbar support system, comprising:
   a cockpit display;
   an armrest of the ejection seat;
   a pump;
   a plurality of bladders fluidly coupled to the pump; and
   a controller coupled to at least one of the cockpit display and the armrest, the controller electrically coupled to the pump, the controller operable to:
     select a bladder in the plurality of bladders to fluidly isolate the bladder from a remainder of bladders in the plurality of bladders; and
     command the pump to inflate the bladder.

2. The lumbar support system of claim 1, further comprising a seat pad, wherein the plurality of bladders and the seat pad are a monolithic component.

3. The lumbar support system of claim 1, wherein the plurality of bladders are configured to be disposed in a seat pad of the ejection seat.

4. The lumbar support system of claim 1, wherein the controller is further operable to command the pump to vary an inflation and a deflation of the plurality of bladders in response to receiving a massage command.

5. A lumbar support system of claim 1, wherein the plurality of bladders comprises a first bladder, a second bladder, and a third bladder, wherein the first bladder is configured to be disposed proximate a seat bucket in a seat back of the ejection seat, wherein the second bladder is configured to be disposed vertically adjacent to the first bladder, and wherein the second bladder is configured to be disposed between the first bladder and the third bladder.

6. The lumbar support system of claim 1, wherein the controller is further operable to select the plurality of bladders to all be in fluid communication with the pump.

7. The lumbar support system of claim 6, wherein the controller is further operable to inflate or deflate all of the plurality of bladders simultaneously.

8. An aircraft ejection seat, comprising:
   a cockpit display;
   a seat bucket;
   a seat back coupled to the seat bucket;
   an armrest coupled to the seat back;
   a control system coupled to at least one of the armrest and the cockpit display, the control system including a controller; and
   a lumbar support system disposed in the seat back, the lumbar support system comprising;
     a seat pad coupled to the seat back;
     an adjustable lumbar region disposed in the seat pad; and
     the controller electrically coupled to at least one of a motor and a pump, the controller operable to adjust and vary a pressure in a lumbar region in response to receiving a massage command.

9. The aircraft ejection seat of claim 8, wherein the seat pad and the adjustable lumbar region are a monolithic component.

10. The aircraft ejection seat of claim 8, wherein the adjustable lumbar region comprises a bladder in fluid communication with the pump.

11. The aircraft ejection seat of claim 8, wherein the adjustable lumbar region comprises a plurality of springs coupled to the seat pad.

12. The aircraft ejection seat of claim 11, wherein the plurality of springs are operably coupled to the motor, and wherein the motor is configured to actuate the plurality of springs.

* * * * *